US008967005B2

(12) United States Patent
Saji et al.

(10) Patent No.: US 8,967,005 B2
(45) Date of Patent: Mar. 3, 2015

(54) ENGAGEMENT CHAIN TYPE DEVICE FOR FORWARD AND BACKWARD MOVEMENT OPERATION

(75) Inventors: Tomoyuki Saji, Osaka (JP); Keisuke Murakami, Osaka (JP)

(73) Assignee: Tsubakimoto Chain Co., Osaka-shi, Osaka (JP)

( * ) Notice: Subject to any disclaimer, the term of this patent is extended or adjusted under 35 U.S.C. 154(b) by 0 days.

(21) Appl. No.: 13/983,806

(22) PCT Filed: Dec. 27, 2011

(86) PCT No.: PCT/JP2011/080160
§ 371 (c)(1), (2), (4) Date: Aug. 6, 2013

(87) PCT Pub. No.: WO2012/108110
PCT Pub. Date: Aug. 16, 2012

(65) Prior Publication Data

US 2013/0312554 A1 Nov. 28, 2013

(30) Foreign Application Priority Data

Feb. 10, 2011 (JP) ................................ 2011-027365

(51) Int. Cl.
*F16H 27/02* (2006.01)
*F16H 19/06* (2006.01)
(Continued)

(52) U.S. Cl.
CPC .............. *F16H 19/0636* (2013.01); *B66F 3/06* (2013.01); *F16G 13/20* (2013.01)
USPC ........................................... 74/89.2; 474/150

(58) Field of Classification Search
USPC .............. 74/89.21, 89.22; 474/140, 149, 150, 474/158, 159
See application file for complete search history.

(56) References Cited

U.S. PATENT DOCUMENTS 3,645,146 A * 2/1972 Nagin .......................... 74/89.21
4,719,840 A * 1/1988 Goodell et al. .................. 89/47

(Continued)

FOREIGN PATENT DOCUMENTS

CA 2070284 4/1992
CN 101424313 5/2009

(Continued)

OTHER PUBLICATIONS

International Search Report prepared by the Japanese Patent Office on Apr. 17, 2012, for International Application No. PCT/JP2011/080160.

(Continued)

*Primary Examiner* — David M Fenstermacher
*Assistant Examiner* — Zakaria Elahmadi
(74) *Attorney, Agent, or Firm* — Sheridan Ross P.C.

(57) ABSTRACT

Provided is an interlocking chain forward and backward actuating device type device, the device being configured so that the space within the device is effectively utilized and that a device configuration most suitable for driving interlocking chains is selected to enable the interlocking chains to be smoothly driven. An interlocking chain type forward and backward actuating device (100) is configured in such a manner that a pair of flat face-shaped chain support faces (132AS, 132AS) which sandwich and support a rigid chain portion (110G) from both sides thereof each form a portion of each of the guide groove faces (132, 132) of chain guide grooves (131, 131) while being continuously connected to each of a pair of curved guide faces (132BS, 132BS) which respectively guide disengaged portions (110H, 110H) of a pair of interlocking chains (110, 110), the disengaged portions (110H, 110H) having been disengaged from each other.

7 Claims, 13 Drawing Sheets

853 853a 853a 800 820 820 820 820 830 821 810 820 821 810

(51) Int. Cl.
*B66F 3/06* (2006.01)
*F16G 13/20* (2006.01)

(56) References Cited

U.S. PATENT DOCUMENTS

| | | | | |
|---|---|---|---|---|
| 5,271,182 | A * | 12/1993 | Greisner et al. | 49/325 |
| 5,355,643 | A * | 10/1994 | Bringolf | 52/108 |
| 6,419,603 | B1 * | 7/2002 | Grasl | 474/202 |
| 6,530,177 | B1 * | 3/2003 | Sørensen | 49/325 |
| 6,787,702 | B2 * | 9/2004 | Suzuki | 174/72 A |
| 7,270,619 | B2 * | 9/2007 | Bourc'His | 474/202 |
| 7,621,078 | B2 * | 11/2009 | Phelan et al. | 52/121 |
| 7,921,986 | B2 | 4/2011 | Ando | |
| 8,011,260 | B2 * | 9/2011 | Scott et al. | 74/89.2 |
| 8,069,954 | B2 * | 12/2011 | Kempf | 187/250 |
| 8,341,931 | B2 * | 1/2013 | Ando et al. | 59/78 |
| 2006/0219144 | A1 | 10/2006 | Phelan et al. | |
| 2008/0199295 | A1 * | 8/2008 | Scott et al. | 414/744.1 |
| 2009/0124444 | A1 * | 5/2009 | Soerensen | 474/206 |
| 2009/0166155 | A1 | 7/2009 | Hishioka et al. | |
| 2009/0211220 | A1 * | 8/2009 | Scott et al. | 59/89 |
| 2010/0059727 | A1 | 3/2010 | Suko | |
| 2010/0140572 | A1 | 6/2010 | Aoki | |
| 2010/0223901 | A1 * | 9/2010 | Ando et al. | 59/82 |
| 2013/0276422 | A1 | 10/2013 | Saji | |
| 2013/0283945 | A1 * | 10/2013 | Kaisaku et al. | 74/89.21 |
| 2013/0298705 | A1 | 11/2013 | Saji et al. | |

FOREIGN PATENT DOCUMENTS

| | | |
|---|---|---|
| EP | 0799788 A1 | 10/1997 |
| JP | S51-131060 | 11/1976 |
| JP | S64-058833 | 3/1989 |
| JP | HO3-012646 | 1/1991 |
| JP | H05-003300 | 1/1993 |
| JP | H06-13399 | 4/1994 |
| JP | 9-119495 A | 5/1997 |
| JP | H09-119495 | 5/1997 |
| JP | H11-278797 | 10/1999 |
| JP | 3384491 | 12/2002 |
| JP | 2007-269414 | 10/2007 |
| JP | 2008-256202 | 10/2008 |
| JP | 2009-001398 | 1/2009 |
| JP | 2009-113872 | 5/2009 |
| JP | 2009-242010 A | 10/2009 |
| JP | 2009-255997 | 11/2009 |
| JP | 2010-047384 | 3/2010 |
| JP | 2010-065721 | 3/2010 |
| JP | 2010-138926 | 6/2010 |
| JP | 2010-138926 A | 6/2010 |
| JP | 2011-144832 | 7/2011 |
| WO | WO 92/07154 | 4/1992 |
| WO | WO 2011/062047 | 5/2011 |
| WO | WO 2013/084766 | 6/2013 |

OTHER PUBLICATIONS

Extended European Search Report for European Patent Application No. 11858399.6, mailed Jul. 25, 2014, 9 pages.

International Search Report prepared by the Japanese Patent Office on Jan. 17, 2012, for International Application No. PCT/JP2011/078679.

International Search Report prepared by the Japanese Patent Office on Mar. 13, 2012, for International Application No. PCT/JP2011/078755.

International Search Report prepared by the Japanese Patent Office on Apr. 17, 2012, for International Application No. PCT/JP2011/080166.

International Search Report prepared by the Japanese Patent Office on Jun. 12, 2012, for International Application No. PCT/JP2012/056703.

International Search Report prepared by the Japanese Patent Office on Jul. 17, 2012, for International Application No. PCT/JP2012/061567.

Official Action for Chinese Patent Application No. 201180067044.0, dated Dec. 3, 2014, 7 pages.

* cited by examiner 110
114
113
110
130
120
121
134AS
132AS
132BS
132
134BS
S
131
134A
134
134B
131
134AS
132AS
132BS
134BS
132

113
113
112
111
111
111
111
112
110G
110H
110
113
113
110G
110H
110
113
113
Chain Width Direction W

ENGAGEMENT CHAIN TYPE DEVICE FOR FORWARD AND BACKWARD MOVEMENT OPERATION

CROSS REFERENCE TO RELATED APPLICATIONS

This application is a national stage application under 35 U.S.C. 371 and claims the benefit of PCT Application No. PCT/JP2011/080166 having an international filing date of 27 Dec. 2011, which designated the United States, and which PCT application claimed the benefit of Japanese Patent Application No. 2011-015066 filed on 27 Jan. 2011, the entire disclosures of which is incorporated by reference herein.

FIELD OF THE INVENTION

The present invention relates to a drive unit used in manufacturing facilities in various manufacturing fields, transportation facilities in the transportation field, nursing care facilities in medical and welfare fields, and stage facilities in art fields, and advancing and retreating a driven body such as a workpiece in parallel to an installation face, in particular, to an interlocking chain type forward and backward actuating device using interlocking chains as drive media for advancing/retreating movement.

BACKGROUND OF THE INVENTION

Conventionally, as a drive unit, an interlocking chain type lifting apparatus has been known that moves a workpiece such as a heavy material by using a pair of lifting interlocking chains interlocked with each other and integrally moved vertically (for example, refer to Patent Document 1).

The pair of lifting interlocking chains used in the conventional interlocking chain type lifting apparatus is designed to be driven by a pair of lifting sprockets, which is arranged on the pair of lifting interlocking chains to face each other, and guided by a chain guide.

PRIOR ART DOCUMENTS

Patent Documents

Patent Document 1: Japanese Laid-Open Patent Publication No. 2009-255997 (claims, FIG. 3)

SUMMARY OF THE INVENTION

However, as shown in FIG. 13, when the interlocking chains 810 are driven by using both of the above-described drive sprockets 820 and the chain guide plates 830, the guide faces of the chain guide plates 830 are limited to arcs according to the outer shapes of the drive sprockets 820, and the interlocking radius of the interlocking chain 810, that is, the radius of the arc locus drawn by the engagement portion engaged with the drive sprocket 820 of the interlocking chain 810 is limited according to the number of teeth of the drive sprocket 820. Thus, it becomes difficult to effectively utilize the space inside the apparatus by reducing the space occupied by the engagement portion of the interlocking chains 810, and to smoothly drive the interlocking chains by selecting an apparatus configuration optimum for chain driving in a state where selection of the configurations of the drive sprockets 820 and the interlocking chains 810 are increased.

Accordingly, a technical problem to be solved by the present invention, that is, an object of the present invention is to provide an interlocking chain type forward and backward actuating device that enables effective utilization of the space inside the device, and to smoothly drive interlocking chains by selecting a device configuration optimum for chain driving while avoiding limitation in combination of the respective configurations of the drive sprockets and the interlocking chains.

The invention of claim 1 solves the above described problems by providing an interlocking chain type forward and backward actuating device comprising a pair of interlocking chains, a drive sprocket, and a chain guide. The interlocking chains are each composed by coupling, in the chain longitudinal direction, a great number of pairs of hook-shaped inner tooth plates facing each other in the chain width direction and a great number of pairs of hook-shaped outer tooth plates arranged on the outer sides of the hook-shaped inner tooth plates in the chain width direction by pairs of front and rear connecting pins. The interlocking chains are integrally made rigid to form a rigid chain part in a state where the interlocking chains are interlocked with each other and arranged to face each other. The interlocking chains are disengaged from each other to bifurcate. The drive sprocket engages with a first one of the pair of interlocking chains from the side face of the rigid chain part to freely advance and retreat the pair of interlocking chains. The chain guide has chain guide grooves that interlock a second one of the interlocking chains with the first interlocking chain to drive the second interlocking chain so as to follow the first interlocking chain. A pair of planar chain support faces sandwiching and supporting the rigid chain part from both sides of the rigid chain part is provided. The planar chain support faces constitute parts of the guide groove faces of the chain guide grooves in a state where the planar chain support faces are continuous to a pair of curved guide faces, which respectively guide chain disengaged portions of the interlocking chains disengaged from each other. The connecting pins of the first interlocking chain include a first connecting pin, which is located on an imaginary boundary plane dividing the planar chain support face and the curved guide face. The connecting pins of the second interlocking chain include a second connecting pin, which faces the first connecting pin along the imaginary boundary plane. The distance between the first connecting pin and the second connecting pin is defined as a pin-to-pin distance on the imaginary boundary plane. The connecting pins of the rigid chain part include a pair of connecting pins that face each other in parallel to the imaginary boundary plane dividing the planar chain support face and the curved guide face, the distance between the pair of connecting pins is defined as a pin-to-pin distance in a rigid state. The pin-to-pin distance on the imaginary boundary plane is equal to the pin-to-pin distance in a rigid state.

The invention of claim 2 solves the above described problems by providing, in addition to the configuration of claim 1, a configuration in which the planar chain support face extends from the imaginary boundary plane for a distance equal to or longer than a pin-to-pin distance between the pair of front and rear connecting pins.

The invention of claim 3 solves the above described problems by providing, in addition to the configuration of claim 1 or 2, a configuration in which a drive sprocket housing groove is formed in the chain guide. The drive sprocket housing groove has an opening opened toward the side face of the rigid chain part and houses the drive sprocket.

The opening has two opening ends, one of which is defined as an imaginary boundary plane side opening end formed on the side closer to the imaginary boundary plane. The terminal end of the planar chain support face overlaps with the imaginary boundary plane side opening end.

The invention of claim 4 solves the above described problems by providing, in addition to the configuration of any one of claims 1 to 3, a configuration in which the pair of hook-shaped inner tooth plates are spaced from each other in the chain width direction. A positioning chain guide portion is provided in a fork region of the pair of interlocking chains. The positioning chain guide portion includes a mountain-shaped chain guide portion and a straight chain support portion. The mountain-shaped chain guide portion guides the chain disengaged portions along flared facing guide faces facing the curved guide faces. The straight chain support portion extends from the imaginary boundary plane to a hollow region of the rigid chain part, wherein the straight chain support portion supports the rigid chain part by planar chain support side faces, which face the planar chain support faces.

The invention of claim 5 solves the above described problems by providing, in addition to the configuration of claim 4, a configuration in which the planar chain support side face extends from the imaginary boundary plane toward the opening for a distance equal to or longer than the pin-to-pin distance between the pair of front and rear connecting pins.

The invention of claim 6 solves the above described problems by providing, in addition to the configuration of claim 1 or 2, a configuration in which the interlocking chains are composed of a plurality of rows by coupling pairs of the hook-shaped inner tooth plates and pairs of the hook-shaped outer tooth plates in the chain width direction. The rows include a supported row that comes into contact with the planar chain support face and an engagement row different from the supported row. The drive sprocket engages with the engagement row.

The invention of claim 7 solves the above described problems by providing, in addition to the configuration of claim 1 or 2, a configuration in which the connecting pins are guided by the chain guide grooves while projecting to the outside from plate faces of the hook-shaped outer tooth plates.

The interlocking chain type forward and backward actuating device according to claim 1 of the present invention includes a pair of interlocking chains, a drive sprocket, and a chain guide. The interlocking chains are each composed by coupling, in the chain longitudinal direction, a great number of pairs of hook-shaped inner tooth plates facing each other in the chain width direction and a great number of pairs of hook-shaped outer tooth plates arranged on the outer sides of the hook-shaped inner tooth plates in the chain width direction by pairs of front and rear connecting pins. The interlocking chains are integrally made rigid to form a rigid chain part in a state where the interlocking chains are interlocked with each other and arranged to face each other. The interlocking chains are disengaged from each other to bifurcate. The drive sprocket engages with a first pair of interlocking chains from the side face of the rigid chain part to freely advance and retreat the pair of interlocking chains. The chain guide has chain guide grooves that interlock a second interlocking chain with the first interlocking chain to drive the second interlocking chain so as to follow the first interlocking chain. Thus, not only can the driven body be advanced/retreated according to advancing/retreating movement of the pair of interlocking chains, but also particular effects corresponding with specific configurations as below can be exerted.

More specifically, the interlocking chain type forward and backward actuating device according to claim 1 of the present invention is configured such that a pair of planar chain support faces sandwiching and supporting the rigid chain part from both sides of the rigid chain part is provided. The planar chain support faces constitute parts of the guide groove faces of the chain guide grooves in a state where the planar chain support faces are continuous to a pair of curved guide faces, which respectively guide chain disengaged portions of the interlocking chains disengaged from each other. Therefore, the thickness of the rigid chain part is maintained until the movement for interlocking between the hook-shaped inner tooth plates and the movement for interlocking between the hook-shaped outer tooth plates are respectively completed after the interlocking chains are guided by the pair of curved guide faces to start interlocking movement. Thus, the space inside the device can be effectively utilized by reducing the space occupied by the engagement portion between the interlocking chain and the drive sprocket. In addition, a device configuration optimum for chain driving can be selected while avoiding limitation in combination of respective components of the drive sprocket and the interlocking chain. Moreover, the interlocking chains can be smoothly driven in a state where the chain rigidity is improved by reliably avoiding disengagement between the interlocking chains and reliably supporting the rigid chain part.

The connecting pins of the first interlocking chain include a first connecting pin, which is located on an imaginary boundary plane dividing the planar chain support face and the curved guide face. The connecting pins of the second interlocking chain include a second connecting pin, which faces the first connecting pin along the imaginary boundary plane. The distance between the first connecting pin and the second connecting pin is defined as a pin-to-pin distance on the imaginary plane. The connecting pins of the rigid chain part include a pair of connecting pins that face each other in parallel to the imaginary boundary plane dividing the planar chain support face and the curved guide face. The distance between the pair of connecting pins is defined as a pin-to-pin distance in a rigid state. The pin-to-pin distance on the imaginary boundary plane is equal to the pin-to-pin distance in a rigid state. Thus, the rigid chain part is supported so as not to disengage from the point at which the rigid chain part is formed by interlocking the hook-shaped inner tooth plates or the hook-shaped outer tooth plates with each other via a hook-shaped plate interlocking face between the first connecting pin and the second connecting pin. Accordingly, the space occupied by the engagement portion between the first interlocking chain and the drive sprocket is reduced. The space inside the device can be effectively utilized. In addition, the interlocking chains can be more smoothly driven by selecting a device configuration optimum for chain driving while avoiding limitation in combination of respective components of the drive sprockets and the interlocking chain.

The interlocking chain type forward and backward actuating device according to claim 2 of the present invention is configured such that, in addition to the effect exerted by the interlocking chain type forward and backward actuating device according to claim 1, the planar chain support face extends from the imaginary boundary plane for a distance equal to or longer than the pin-to-pin distance between the pair of front and rear connecting pins. Thus, the rigid chain part is supported in a range equal to or more than the pin-to-pin distance between the pair of front and rear connecting pins, so that the interlocking chains can be more smoothly driven in a state where chain rigidity is further improved by reliably avoiding disengagement between the pair of interlocking chains and reliably supporting the rigid chain part.

The interlocking chain type forward and backward actuating device according to claim 3 of the present invention is configured such that, in addition to the effect exerted by the interlocking chain type forward and backward actuating device according to claim 1 or 2, a drive sprocket housing groove is formed in the chain guide. The drive sprocket housing groove has an opening opened toward the side face of the rigid chain part and houses the drive sprocket. The opening has two opening ends, one of which is defined as an imaginary boundary plane side opening end formed on the side closer to the imaginary boundary plane. The terminal end of the planar chain support face overlaps with the imaginary boundary plane side opening end. Thus, the movement for interlocking between the hook-shaped inner tooth plates and the movement for interlocking between the hook-shaped outer tooth plates are completed before the hook-shaped inner tooth plates and the hook-shaped outer tooth plates are driven to the imaginary boundary plane side opening end. Accordingly, the rigid chain part can be reliably prevented from disassembling, that is, disengaging and the interlocking chains can be more smoothly driven.

The interlocking chain type forward and backward actuating device according to claim 4 of the present invention is configured such that, in addition to the effect exerted by the interlocking chain type forward and backward actuating device according to any one of claims 1 to 3, the pair of hook-shaped inner tooth plates are spaced from each other in the chain width direction. A positioning chain guide portion is provided in a fork region of the pair of the interlocking chains. The positioning chain guide portion includes a mountain-shaped chain guide portion that guides the chain disengaged portions along flared facing guide faces facing the curved guide faces and a straight chain support portion that extends from the imaginary boundary plane to a hollow region of the rigid chain part. The straight chain support portion supports the rigid chain part by planar chain support side faces, which face the planar chain support faces. Thus, the rigid chain part is supported from the hollow region, that is, the inside of the rigid chain part and the outside of the rigid chain part. Accordingly, the rigid chain part is reliably supported so as not to disengage and the interlocking chains can be more smoothly driven.

The interlocking chain type forward and backward actuating device according to claim 5 of the present invention is configured such that, in addition to the effect exerted by the interlocking chain type forward and backward actuating device according to claim 4, the planar chain support side face extends from the imaginary boundary plane toward the opening for a distance equal to or longer than the pin-to-pin distance between the pair of front and rear connecting pins. Thus, the rigid chain part is supported from the imaginary boundary plane for a distance equal to or longer than the pin-to-pin distance between the pair of front and rear connecting pins from the hollow region, that is, the inside of the rigid chain part and the outside of the rigid chain part. Therefore, the rigid chain part is reliably supported so as not to disengage and the interlocking chains can be more smoothly driven.

The interlocking chain type forward and backward actuating device according to claim 6 of the present invention is configured such that, in addition to the effect exerted by the interlocking chain type forward and backward actuating device according to claim 1 or 2, the interlocking chains are composed of a plurality of rows by coupling pairs of the hook-shaped inner tooth plates and pairs of the hook-shaped outer tooth plates in the chain width direction. The rows include a supported row that comes into contact with the planar chain support face and an engagement row different from the supported row. The drive sprocket engages with the engagement row different. Thus, the chain rigidity is improved in comparison with an interlocking chain composed of a single row. Accordingly, the interlocking chains can be driven while the rigid chain part is reliably supported so as not to disengage.

The interlocking chain type forward and backward actuating device according to claim 7 of the present invention is configured such that, in addition to the effect exerted by the interlocking chain type forward and backward actuating device according to claim 1 or 2, the connecting pins are guided by the chain guide grooves while projecting to the outside from the plate faces of the hook-shaped outer tooth plates. Thus, the rigid chain part is more reliably supported so as not to disengage and the interlocking chains can be more smoothly driven.

DETAILED DESCRIPTION OF THE PREFERRED EMBODIMENTS

Figure 1:
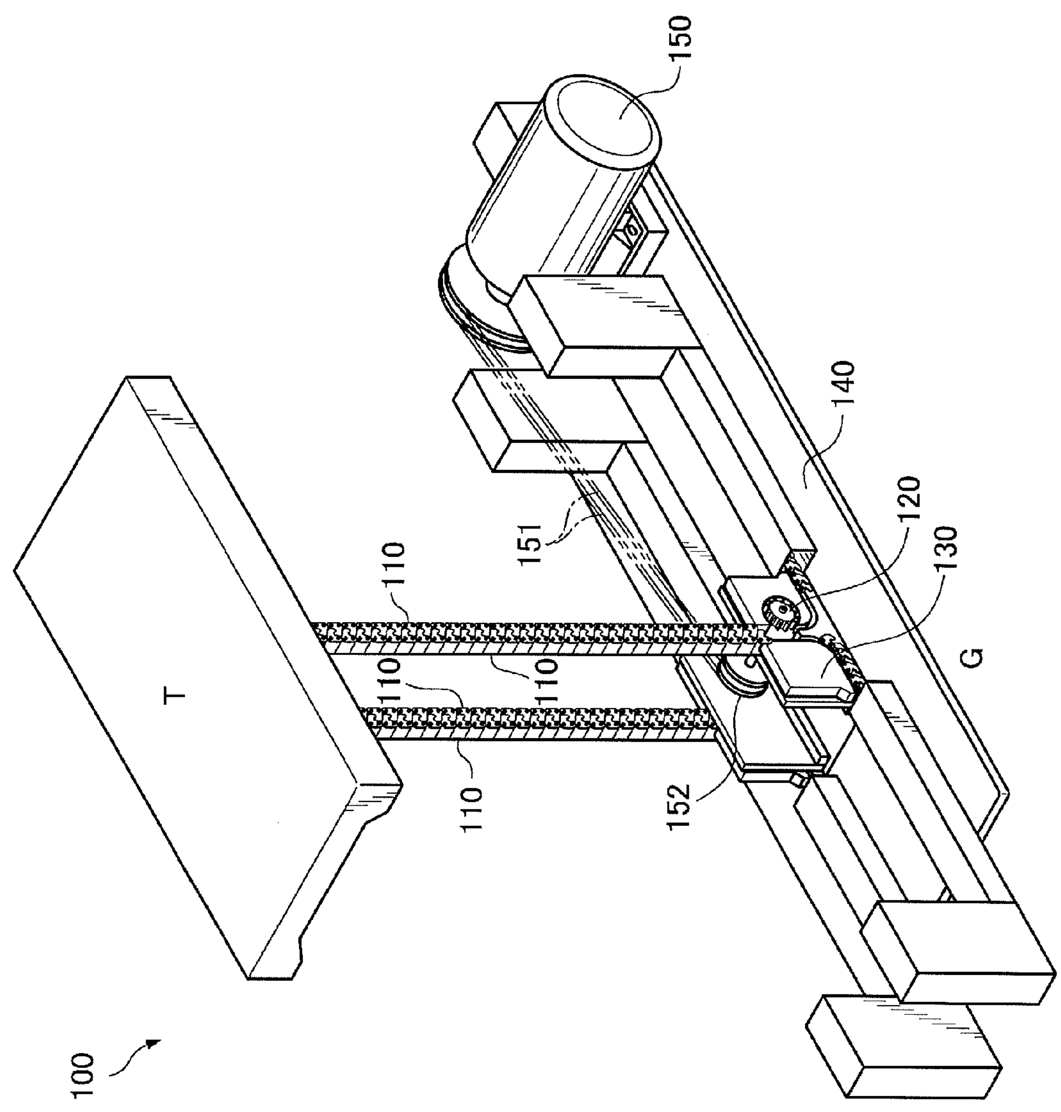
FIG. 1 is a general perspective view of an interlocking chain type forward and backward actuating device according to one embodiment of the present invention.

An interlocking chain type forward and backward actuating device of the present invention includes a pair of interlocking chains, a drive sprocket, and a chain guide. The interlocking chains are each composed by coupling, in the chain longitudinal direction, a great number of pairs of hook-shaped inner tooth plates facing each other in the chain width direction and a great number of pairs of hook-shaped outer tooth plates arranged on the outer sides of the hook-shaped inner tooth plates in the chain width direction by pairs of front and rear connecting pins. The interlocking chains are integrally made rigid to form a rigid chain part in a state where the interlocking chains are interlocked with each other and arranged to face each other. The interlocking chains are disengaged from each other to bifurcate. The drive sprocket engages with a first one of the pair of interlocking chains from the side face of the rigid chain part to freely advance and retreat the pair of interlocking chains. The chain guide has chain guide grooves that interlock a second one of the interlocking chain with the first interlocking chain to drive the second interlocking chain so as to follow the first interlocking chain. A pair of planar chain support faces sandwich and support the rigid chain part from both sides of the rigid chain part. The planar chain support face constitute parts of the guide groove faces of chain guide grooves in a state where the planar chain support faces are continuous to a pair of curved guide faces, which respectively guide chain disengaged portions of the interlocking chains disengaged from each other. The connecting pins of the first interlocking chain include a first connecting pine, which is located on an imaginary boundary plane dividing the planar chain support face and the curved guide face. The connecting pins of the second interlocking chain include a second connecting pin, which faces the first connecting pin along the imaginary boundary plane. The distance between the first connecting pin and the second connecting pin is defined as a pin-to-pin distance on the imaginary boundary plane. The connecting pins of the rigid chain part include a pair of connecting pins that face each other in parallel to the imaginary boundary plane dividing the planar chain support face and the curved guide face, the distance between the pair of connecting pins is defined as a pin-to-pin distance in a rigid state. The pin-to-pin distance on the imaginary boundary plane is equal to the pin-to-pin distance in a rigid state. Thus, the space occupied by the engagement portion between the first interlocking chain and the drive sprocket is reduced and the space inside the device can be effectively utilized. A device configuration optimum for chain driving is selected while avoiding limitation in combination of respective configurations of the drive sprockets and interlocking chain. In addition, the interlocking chains are smoothly driven in a state where chain rigidity is improved by reliably avoiding disengagement between the pair of interlocking chains and reliably supporting the rigid chain part. The present invention may have any specific form as long as it includes these features.

For example, the pair of interlocking chains used in the interlocking chain type forward and backward actuating device according to the present invention may have any form as long as the interlocking chains are integrated by being interlocked with each other and bifurcate from each other by being disengaged from each other. For example, the interlocking chain may be composed of a single row in the chain width direction or two or more rows in the chain width direction. It is more preferable that the interlocking chain is composed of two or more rows in the chain width direction. The hook-shaped outer tooth plates and the hook-shaped inner tooth plates constituting a first one of the pair of interlocking chains are multiplexed and firmly interlocked in hook forms with the hook-shaped outer tooth plates and the hook-shaped inner tooth plates constituting a second one of the interlocking chain facing the first interlocking chain in a plurality of rows in the chain width direction. Thus, buckling frequently occurring in the chain width direction of the interlocking chains can be reliably restrained and excellent chain durability is realized.

The pair of interlocking chains used in the interlocking chain type forward and backward actuating device according to the present invention may be any of interlocking chains having no rollers, that is, having only bushings, or having rollers. When interlocking chains having only bushings are used, the number of chain components is reduced and the chain weight can be reduced.

The pair of interlocking chains used in the interlocking chain type forward and backward actuating device according to the present invention may be driven by interlocking sprocket teeth of the drive sprocket with hook-shaped engagement teeth formed on at least one of the hook-shaped inner plates and the hook-shaped outer tooth plates.

The pair of interlocking chains used in the interlocking chain type forward and backward actuating device according to the present invention may be driven by receiving a driving force only by a drive sprocket engaging with one interlocking chain from only one side face of the pair of interlocking chains. Alternatively, the interlocking chains may be driven by receiving a driving force by a pair of drive sprockets respectively arranged on the side faces of the pair of interlocking chains and engaging with the pair of interlocking chains on a one-to-one basis.

The interlocking chain type forward and backward actuating device according to the present invention has no trouble in vertical movements, with regard to an installation face, when the device is installed on a floor face as stationary installation or suspended from a ceiling face as suspended installation. Further, the device has no trouble in advancing and retreating movements corresponding to the above-described vertical movements when the device is installed on a vertical wall face as cantilever-supported installation.

Embodiments

Hereinafter, an interlocking chain type forward and backward actuating device of one embodiment of the present invention will be described based on the drawings.

Figure 2:
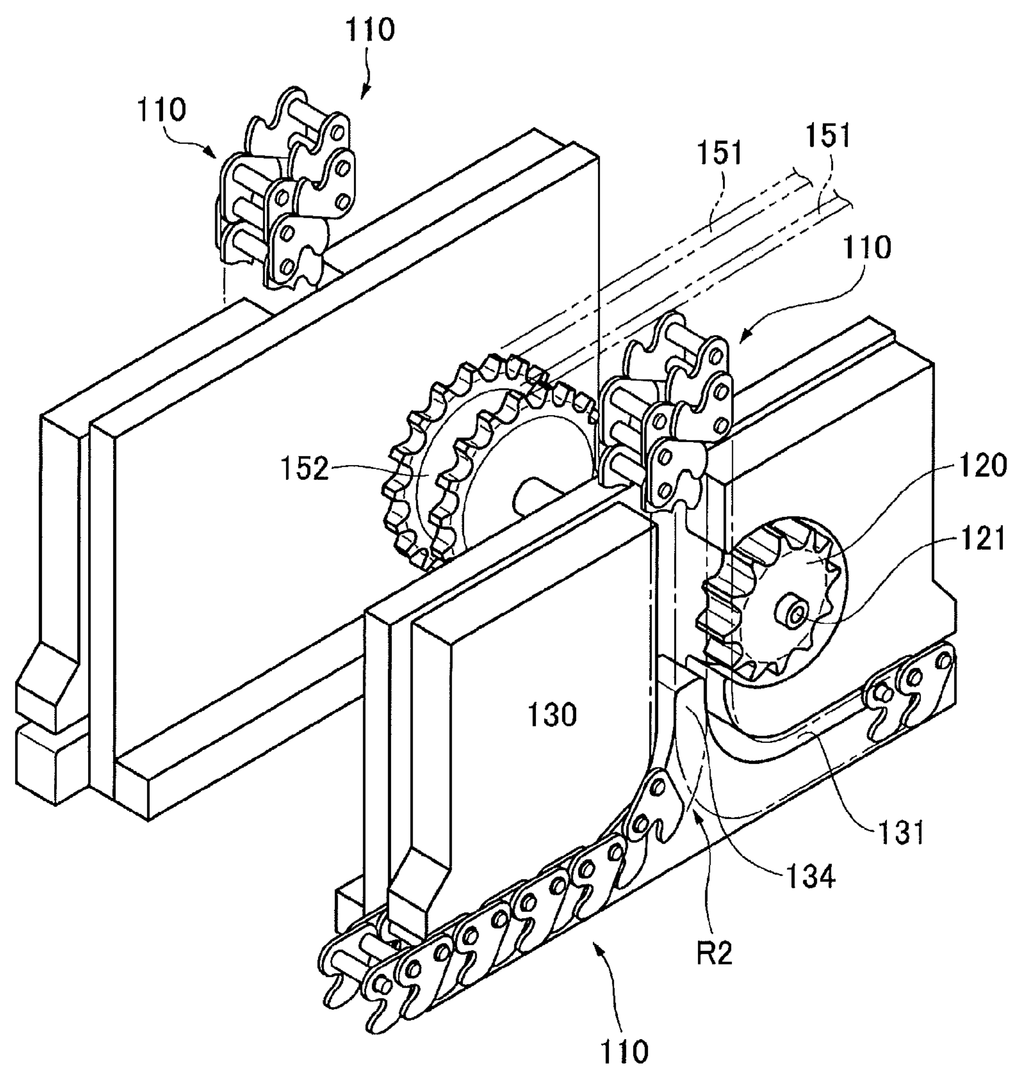
FIG. 2 is a partially enlarged view of the vicinity of a drive sprocket and interlocking chains shown in FIG. 1.
Figure 3:
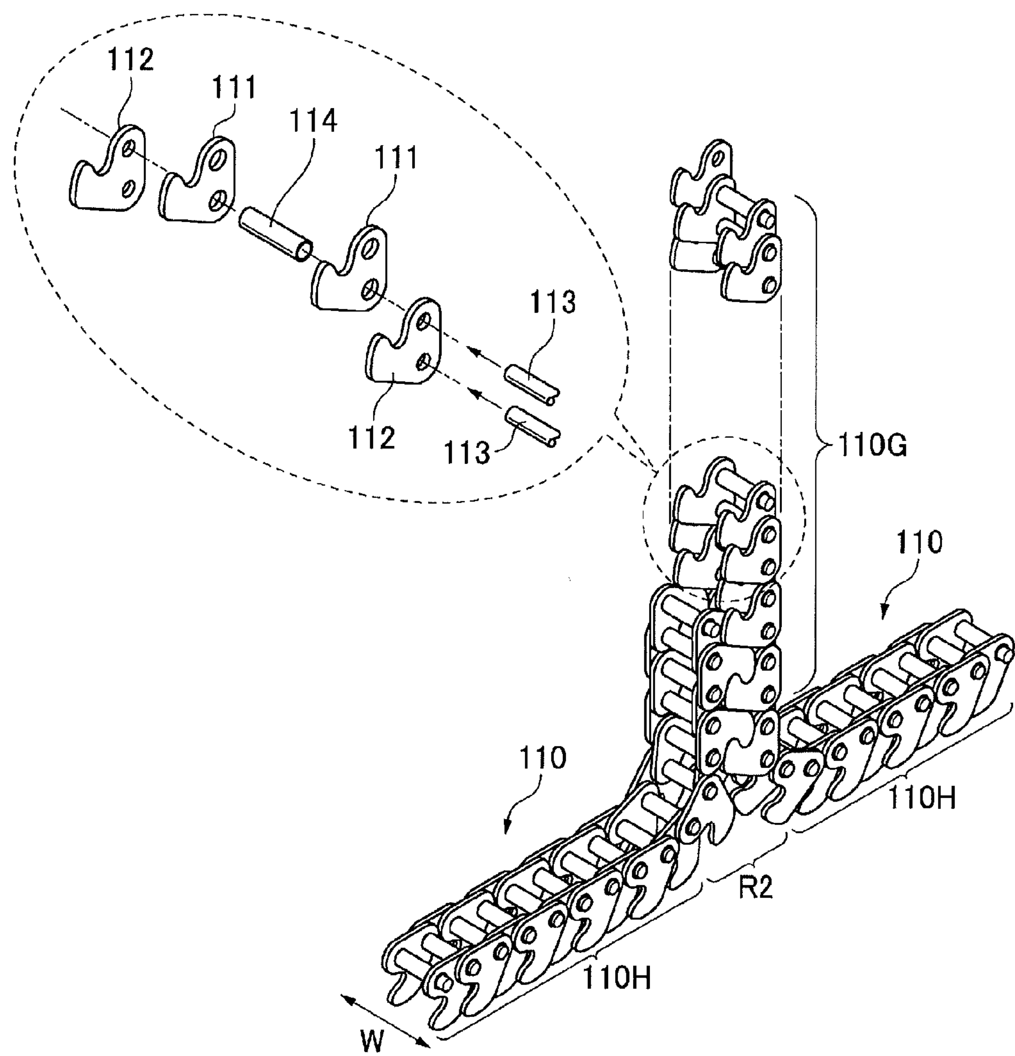
FIG. 3 is a perspective view showing an exploded state and a disengaged state of the interlocking chains.
Figure 4:
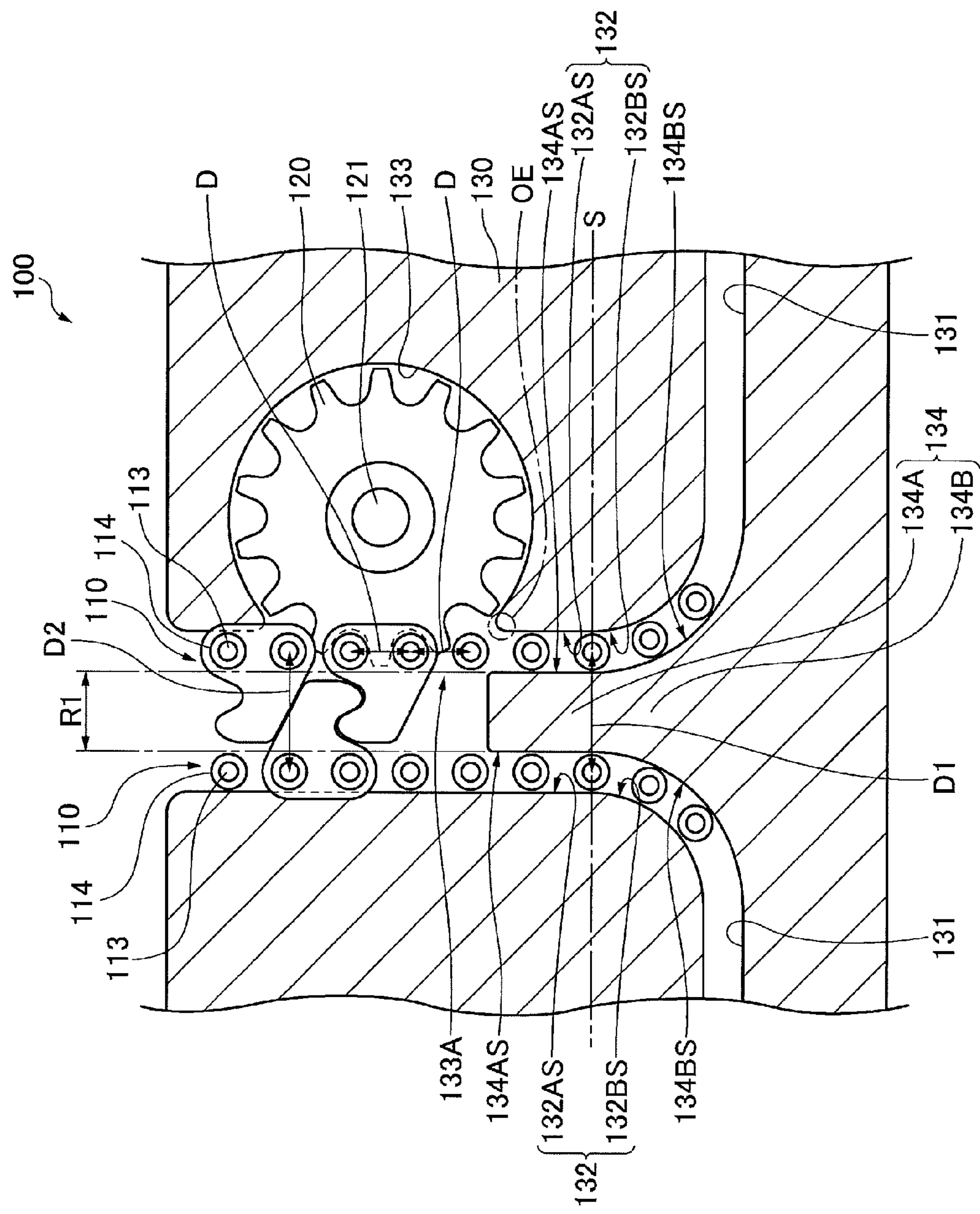
FIG. 4 is a partially enlarged view of the vicinity of the drive sprocket and the interlocking chains shown in FIG. 1.
Figure 5:
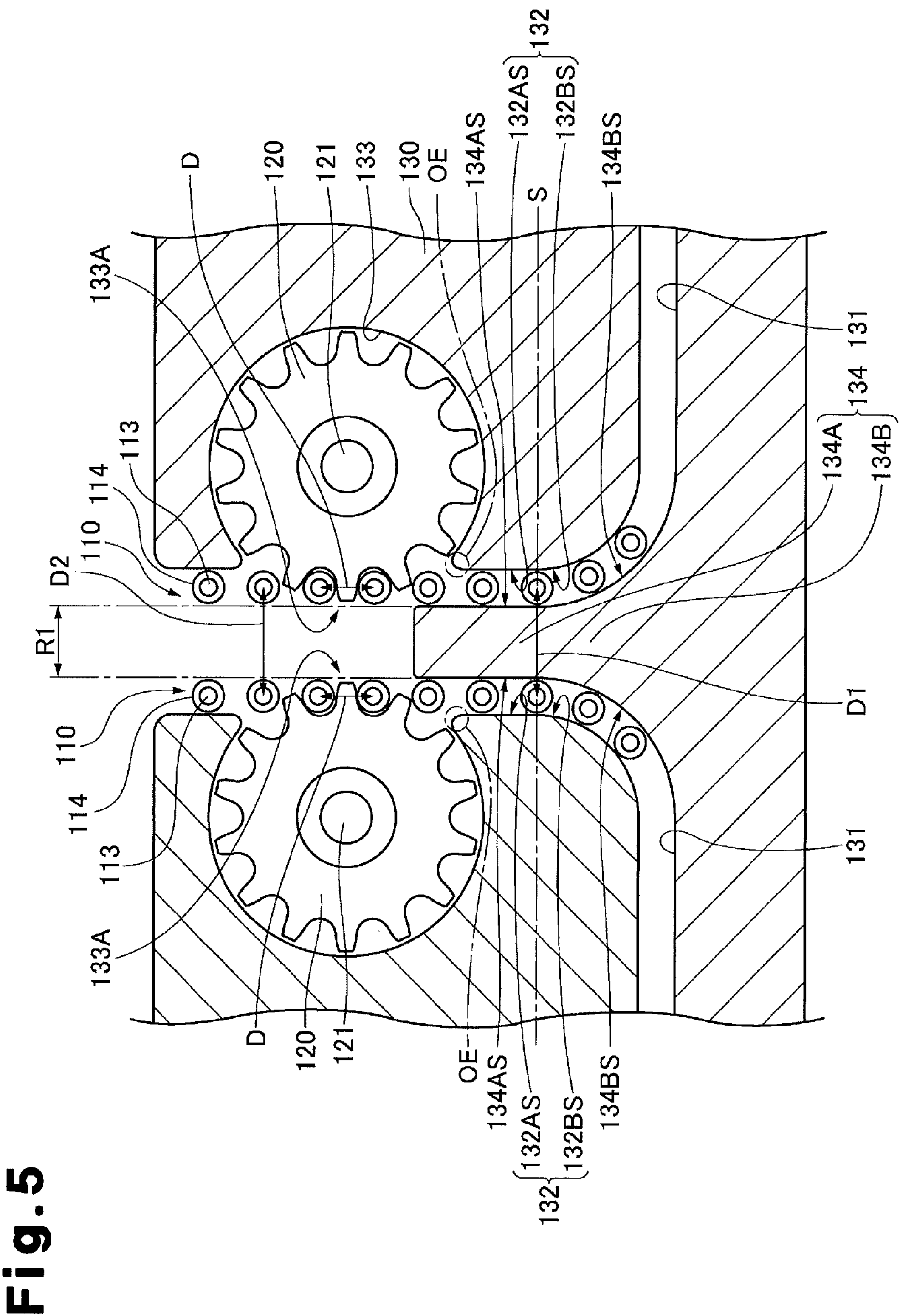
FIG. 5 is a partially enlarged view corresponding to FIG. 4, illustrating a first modification 1.
Figure 6:
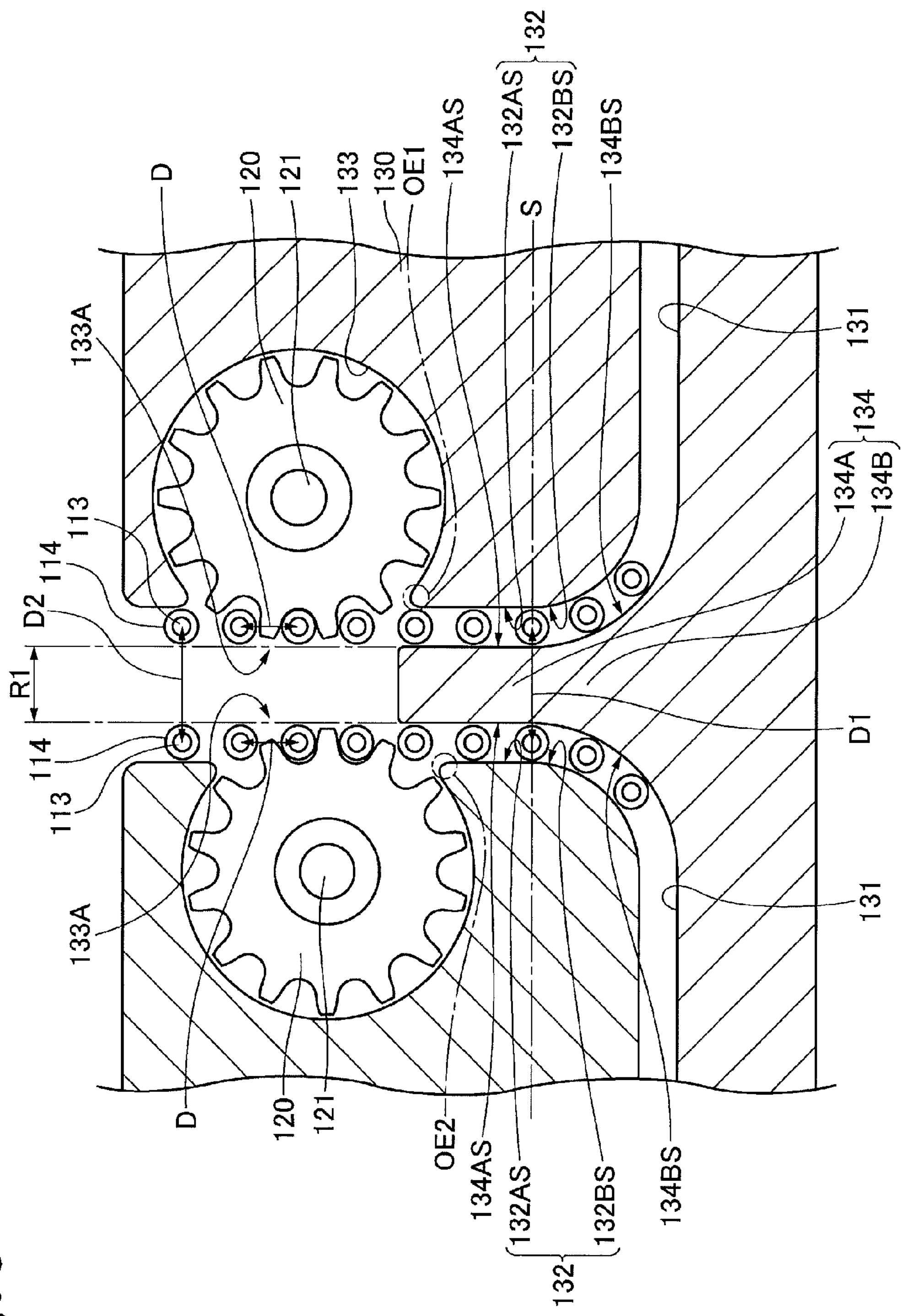
FIG. 6 is a partially enlarged view corresponding to FIG. 4, illustrating a second modification.
Figure 7:
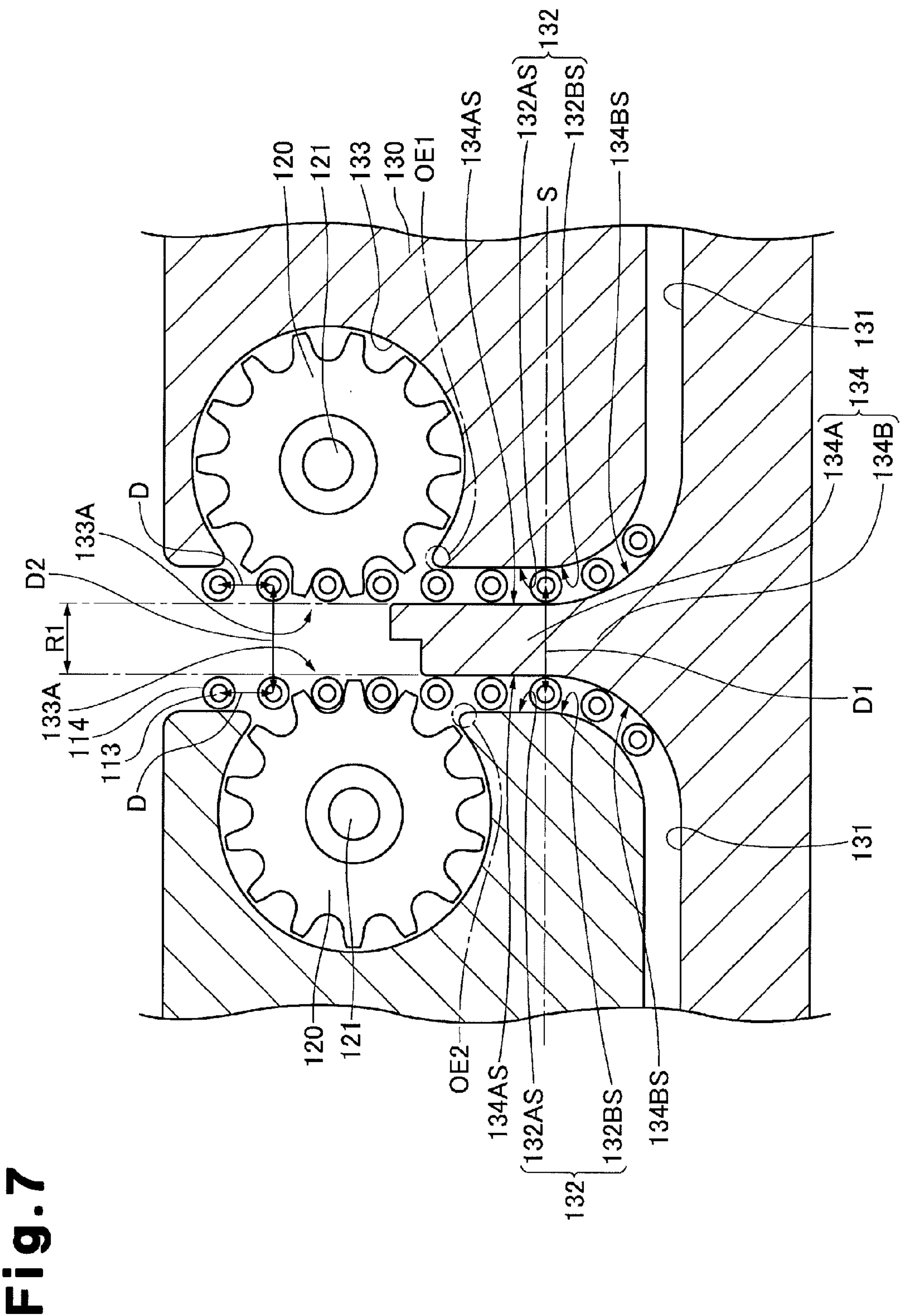
FIG. 7 is a partially enlarged view corresponding to FIG. 4, illustrating a third modification.
Figure 8:
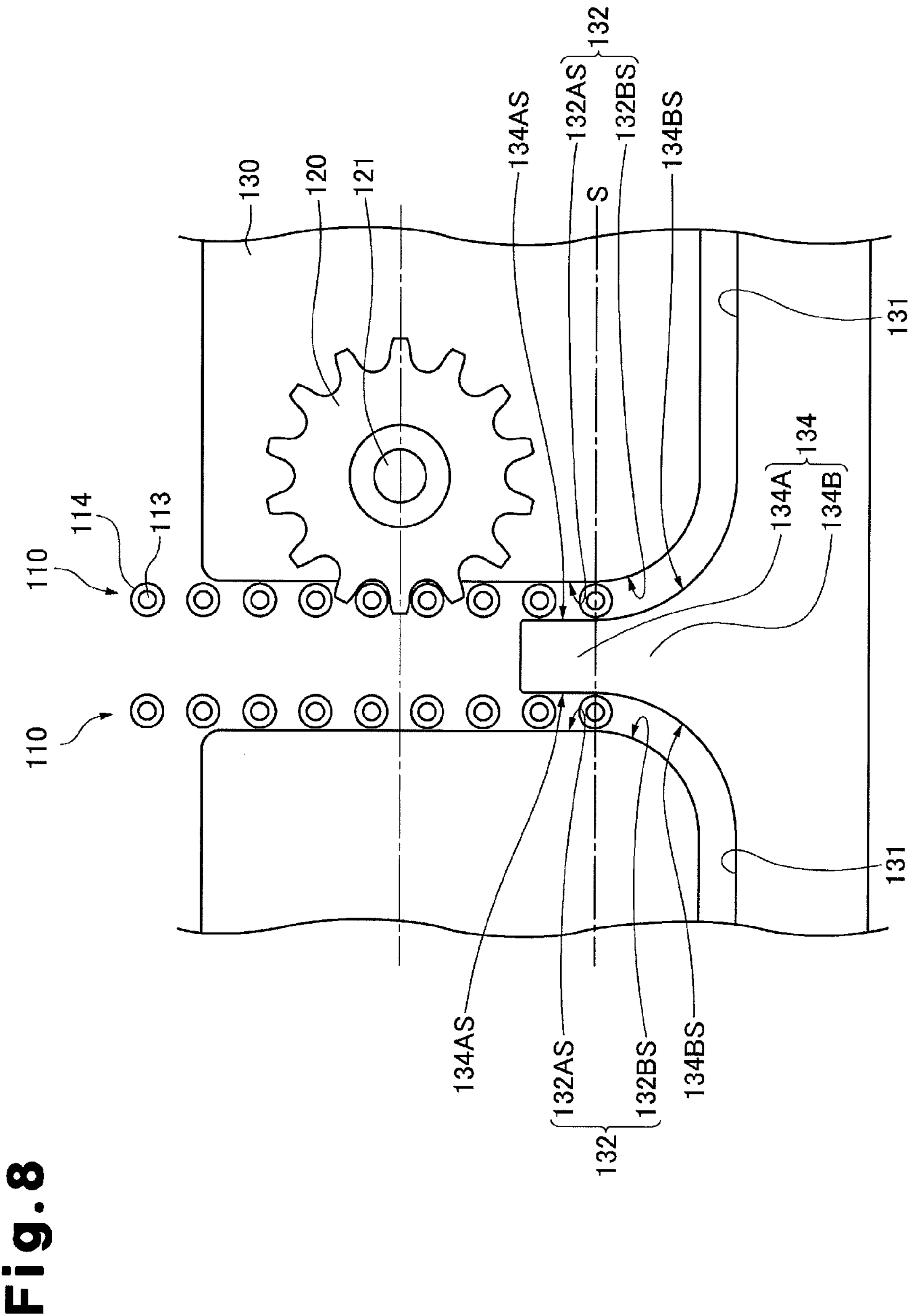
FIG. 8 is a partially enlarged view corresponding to FIG. 4, illustrating a fourth modification 4.
Figure 9:
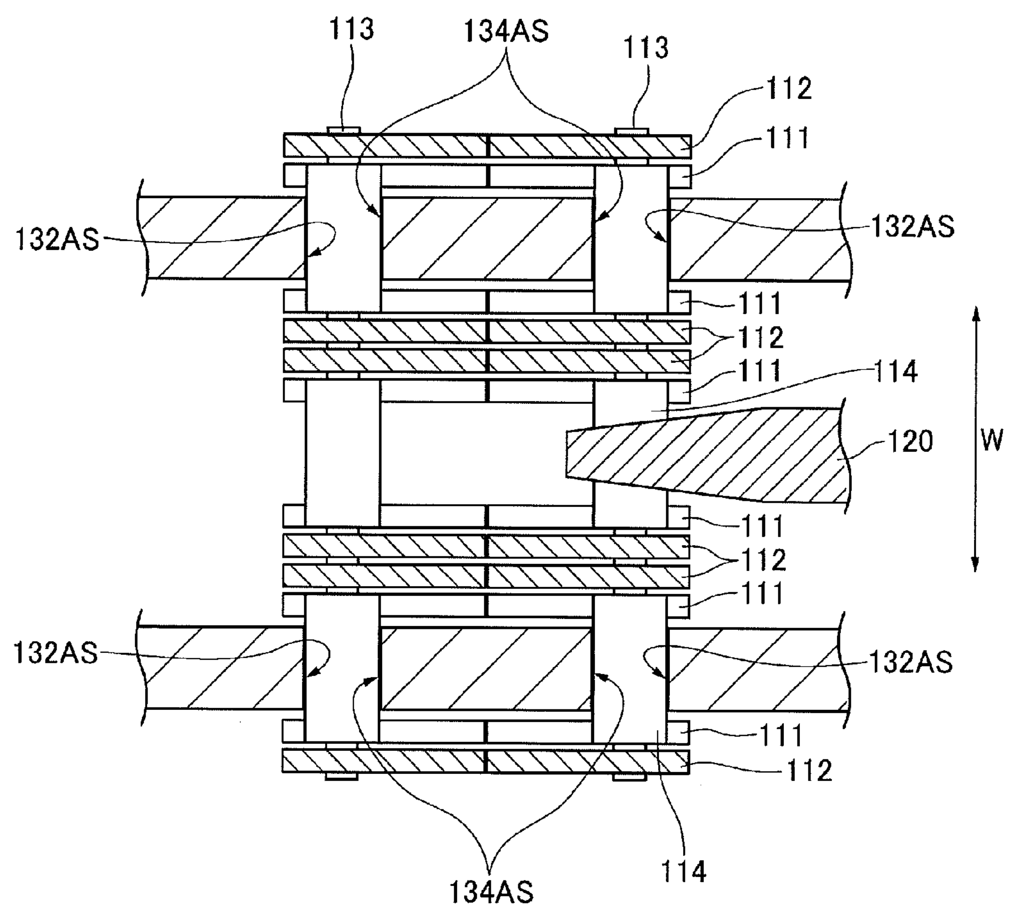
FIG. 9 is a cross-sectional view taken along an imaginary boundary plane of the interlocking chain type forward and backward actuating device according to the fourth modification.
Figure 10:
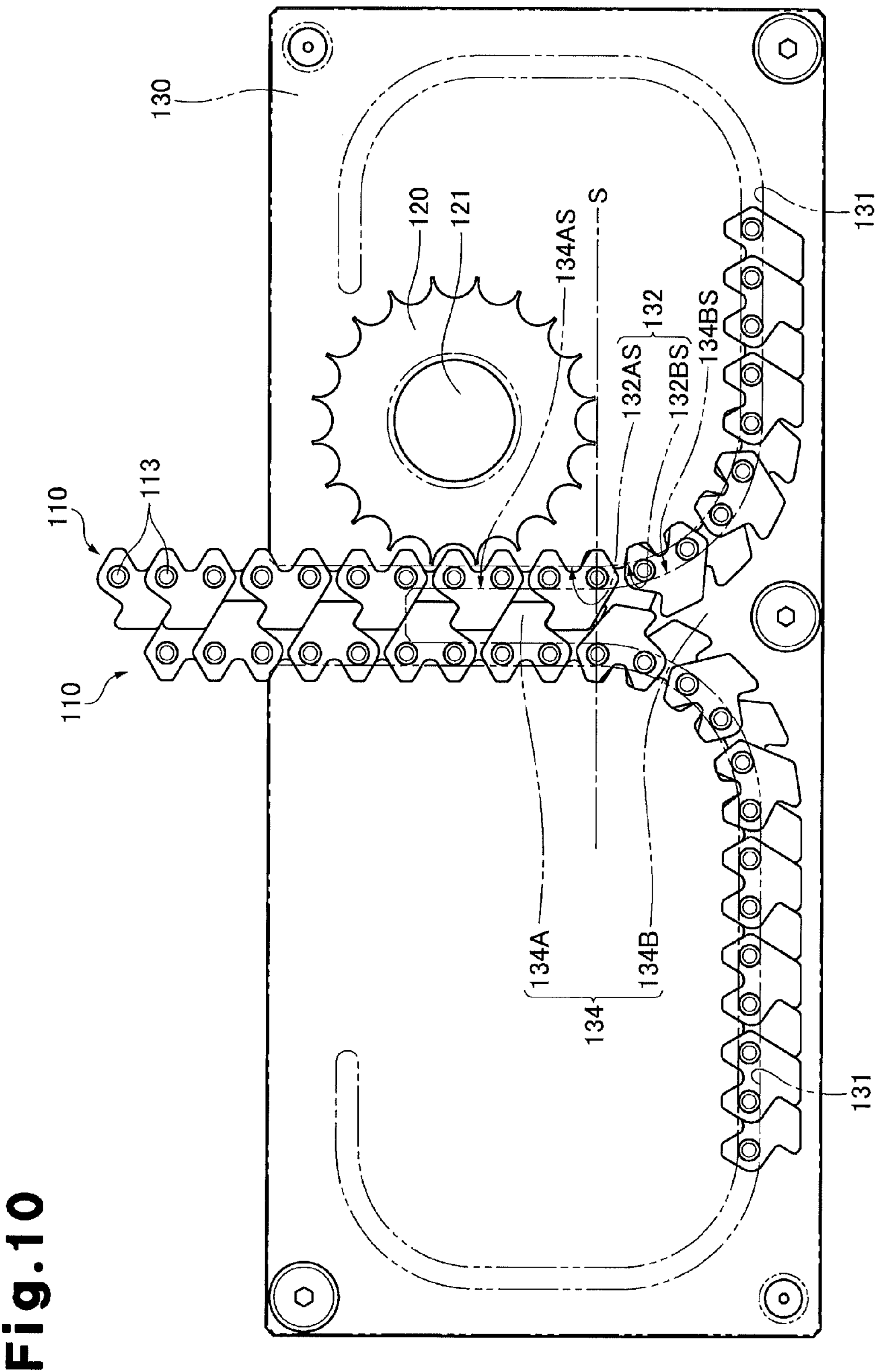
FIG. 10 is a front view of an interlocking chain type forward and backward actuating device according to a fifth modification of the present invention.
Figure 11:
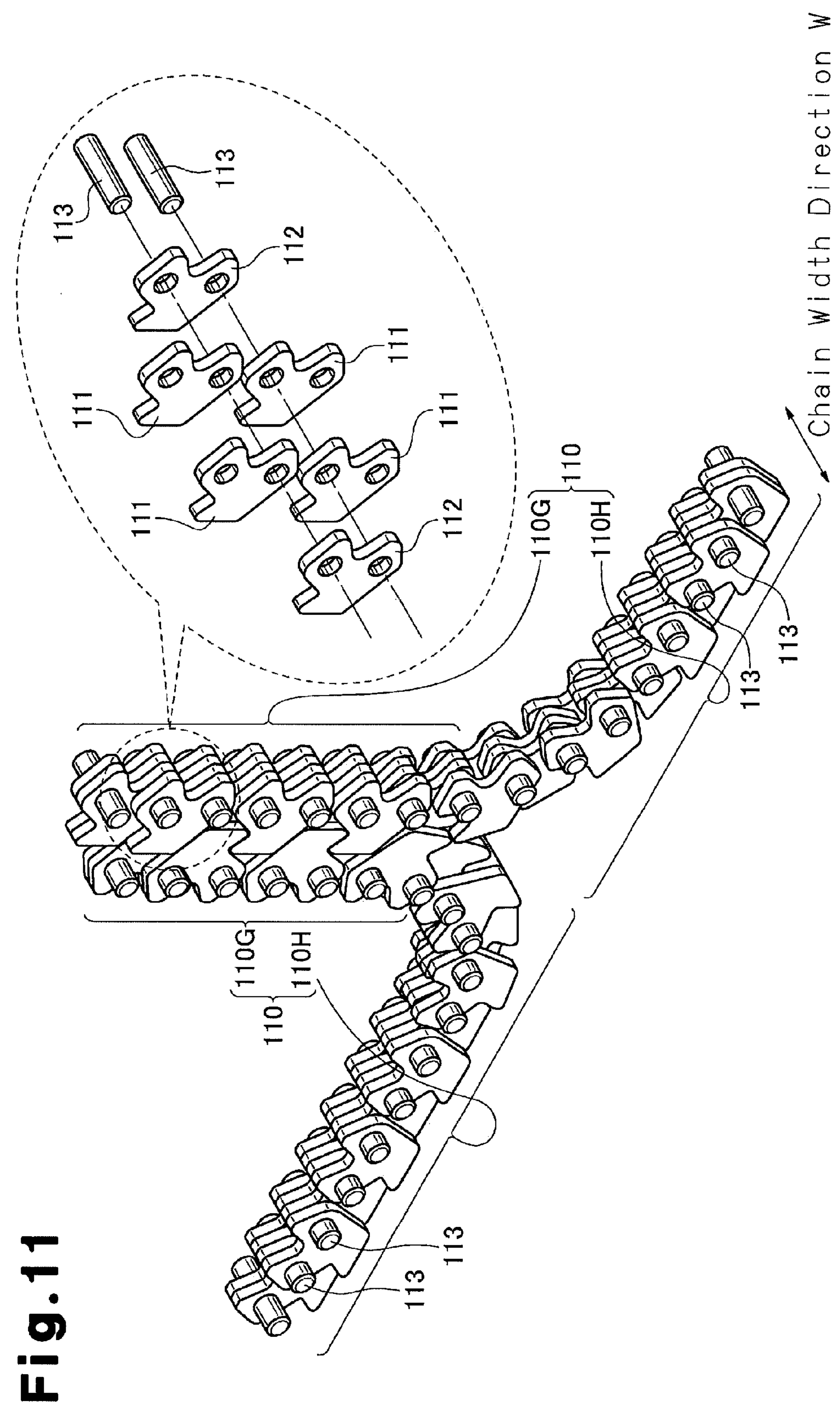
FIG. 11 is a perspective view showing an exploded state and a disengaged state of the interlocking chains used in the fifth modification of the present invention.
Figure 12:
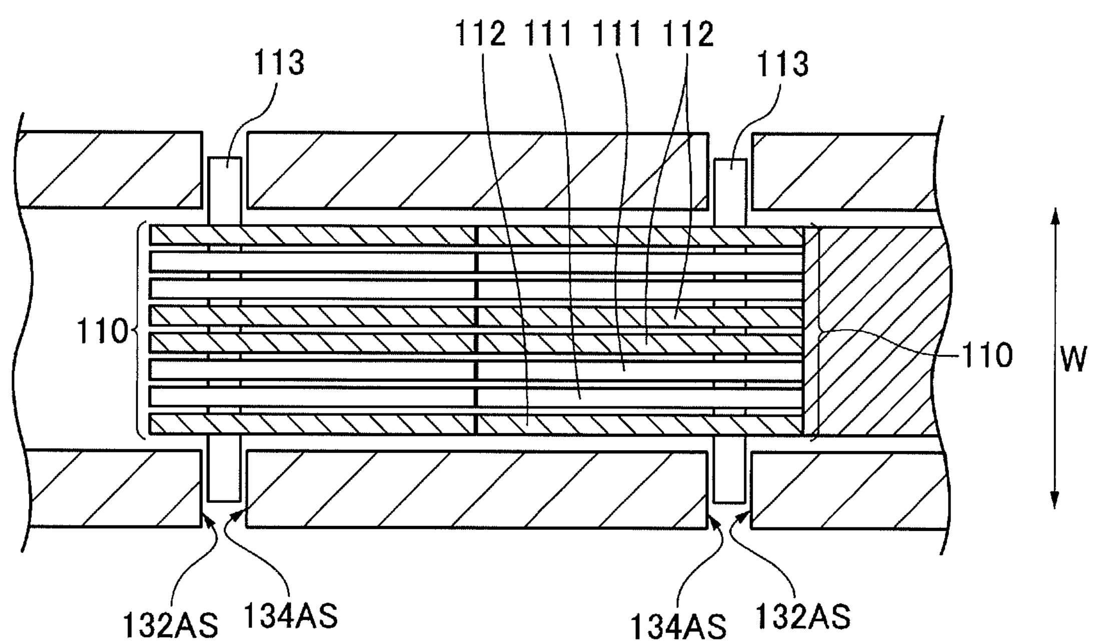
FIG. 12 is a cross-sectional view taken along an imaginary boundary plane of the interlocking chain type forward and backward actuating device according to the fifth modification.
Figure 13:
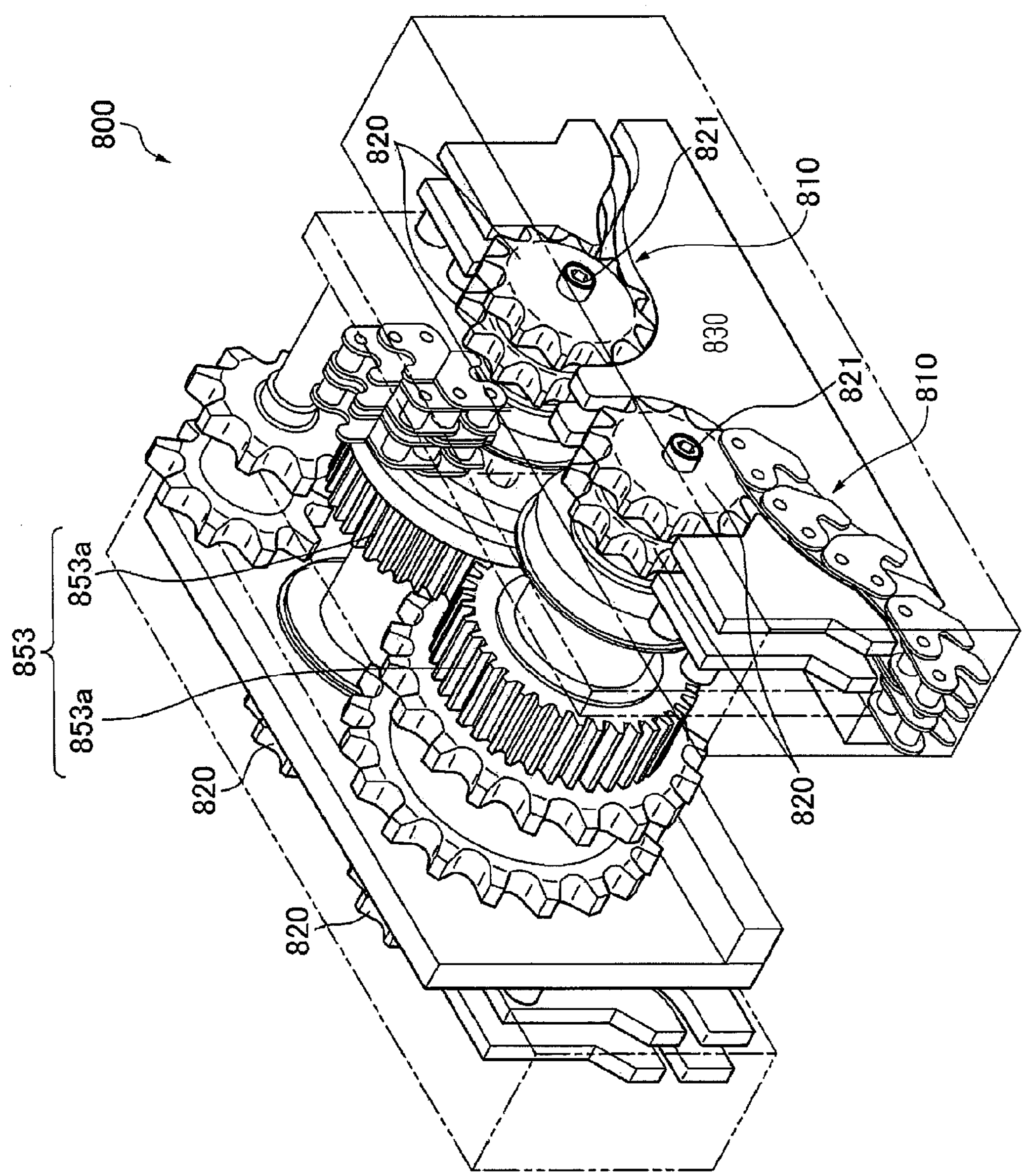
FIG. 13 is a partially enlarged view of a conventional interlocking chain type lifting apparatus.

FIG. 1 is a general perspective view of an interlocking chain type forward and backward actuating device according to one embodiment of the present invention. FIG. 2 is a partially enlarged view of the vicinity of a drive sprocket and interlocking chains shown in FIG. 1. FIG. 3 is a perspective view showing an exploded state and a disengaged state of the interlocking chains. FIG. 4 is a partially enlarged view of the vicinity of the drive sprocket and the interlocking chains shown in FIG. 1. FIG. 5 is a partially enlarged view corresponding to FIG. 4, illustrating a first modification 1. FIG. 6 is a partially enlarged view corresponding to FIG. 4, illustrating a second modification. FIG. 7 is a partially enlarged view corresponding to FIG. 4, illustrating a third modification 3. FIG. 8 is a partially enlarged view corresponding to FIG. 4, illustrating a fourth modification. FIG. 9 is a cross-sectional view taken along an imaginary boundary plane of the interlocking chain type forward and backward actuating device according to the fourth modification. FIG. 10 is a front view of an interlocking chain type forward and backward actuating device according to a fifth modification of the present invention. FIG. 11 is a perspective view showing an exploded state and a disengaged state of the interlocking chains used in the fifth modification. FIG. 12 is a cross-sectional view taken along an imaginary boundary plane of the interlocking chain type forward and backward actuating device according to the fifth modification.

First, an interlocking chain type forward and backward actuating device 100 according to one embodiment of the present invention vertically moves a driven body T, such as a lifting table on which a heavy material (not illustrated) as a workpiece is loaded, with respect to an installation face G as shown in FIG. 1.

The interlocking chain type forward and backward actuating device 100 of the present embodiment includes, as shown in FIG. 1 to FIG. 3, a pair of interlocking chains 110 and 110, a drive sprocket 120, and a chain guide 130. The interlocking chains 110 and 110 are each composed by coupling, in the chain longitudinal direction, a great number of pairs of hook-shaped inner tooth plates 111 facing each other in the chain width direction W and a great number of pairs of hook-shaped outer tooth plates 112 arranged on the outer sides of the hook-shaped inner tooth plates 111 in the chain width direction W by pairs of front and rear connecting pins 113. The interlocking chains 110 and 110 are integrally made rigid to form a rigid chain part 110G in a state where the interlocking chains 110 and 110 are interlocked with each other and arranged to face each other. The interlocking chains 110 and 110 are disengaged from each other to bifurcate. The drive sprocket 120 engages with a first one of the pair of interlocking chains 110 and 110 from a side face of the rigid chain part 110G to freely advance and retreat the pair of interlocking chains 110 and 110. The chain guide 130 has chain guide grooves 131 that interlock a second one the interlocking chains 110 with the first interlocking chain 110 to drive the second interlocking chain 110 so as to follow the first interlocking chain 110. The interlocking chain type forward and backward actuating device 100 advances and retreats the driven body T on the base plate 140 according to advancing and retreating movement of the pair of interlocking chains 110 and 110.

The interlocking chain type forward and backward actuating device 100 further includes a power transmission chain 151, which transmits power to a driven side sprocket 152 for rotating the drive sprocket 120, and a drive motor 150 as a drive source, which drives the power transmission chain 151. Motor torque of the drive motor 150 is transmitted without waste by directly supporting and pushing up the driven body T on which the workpiece is loaded by the pair of interlocking chains 110 and 110.

The drive sprocket 120 is designed to engage with bushings 114, which are part of the interlocking chains 110.

The pair of interlocking chains 110 and 110 used in the interlocking chain type forward and backward actuating device 100 are, as shown in FIG. 3, composed by coupling a great number of inner link units, which are each formed by press-fitting a pair of front and rear bushings 114 with the hook-shaped inner tooth plates 111 and 111 located in pairs and spaced from each other in the chain width direction W by pairs of front and rear connecting pins 113 press-fitted in pairs of front and rear pin holes of the hook-shaped outer tooth plates 112 located on the outermost side in the chain width direction W.

Next, the characteristic configuration of the interlocking chain type forward and backward actuating device 100 of the embodiment described above will be described in more detail with reference to FIGS. 1 to 4.

In the interlocking chain type forward and backward actuating device 100, as shown in FIGS. 1 to 4, a pair of planar chain support faces 132AS and 132AS sandwiching and supporting the rigid chain part 110G from both sides of the rigid chain part 110G constitute portions of guide groove faces 132 and 132 of chain guide grooves 131 and 131. The chain support faces 132AS and 132AS are continuous to a pair of curved guide faces 132BS and 132BS, which respectively guide chain disengaged portions 110H and 110H of the pair of interlocking chains 110 and 110 disengaged from each other.

Accordingly, the thickness of the rigid chain part 110G is maintained until the movement for interlocking between the hook-shaped inner tooth plates 111 and the movement for interlocking between the hook-shaped outer tooth plates 112 are respectively completed after the pair of interlocking chains 110 and 110 are guided by the pair of curved guide faces 132BS and 132BS to start engaging movement. Thus, the space occupied by the engagement portion between the interlocking chain 110 and the drive sprocket 120 is reduced and the space inside the device is effectively utilized, and a device configuration optimum for chain driving is selected while avoiding limitation in combination of respective components of the drive sprocket 120 and the interlocking chain 110. In addition, the interlocking chains 110 and 110 are smoothly driven in a state where the chain rigidity is improved by reliably avoiding disengagement between the pair of interlocking chains 110 and 110 and reliably supporting the rigid chain part 110G.

The connecting pins 113 of the first interlocking chain 110 include a first connecting pin 113, which is located on an imaginary boundary plane S dividing the planar chain support face 132A and the curved guide face 132BS. The connecting pins 113 of the second interlocking chain 110 include a second connecting pin 113, which faces the first connecting pin 113 along the imaginary boundary plane S. The distance between the first connecting pin 113 and the second connecting pin 113 is defined as a pin-to-pin distance D1 on the imaginary boundary plane S. The connecting pins 113 of the rigid chain part 110G include a pair of connecting pins 113 that face each other along the imaginary boundary plane S, or in parallel to the imaginary boundary plane S. The distance between the pair of connecting pins 113 is defined as a pin-to-pin distance D2 in a rigid state. The pin-to-pin distance D1 on the imaginary boundary plane S is equal to the pin-to-pin distance D2 in a rigid state.

Accordingly, from the point at which the rigid chain part 110G is formed by interlocking the hook-shaped inner tooth plates 111 or the hook-shaped outer tooth plates 112 with each other via the hook-shaped plate interlocking faces between the first connecting pin 113 and the second connecting pin 113, the rigid chain part 110G is supported so as not to disengage, so that the space occupied by the engagement portion between the first interlocking chain 110 and the drive sprocket 120 is reduced and the space inside the device is effectively utilized. In addition, the interlocking chains 110 are more smoothly driven by selecting a device configuration optimum for chain driving while avoiding limitation in combination of respective components of the drive sprocket 120 and the interlocking chain 110.

In the interlocking chain type forward and backward actuating device 100, the planar chain support face 132AS extends from the imaginary boundary plane S for a distance equal to or longer than the pin-to-pin distance D between the pair of front and rear connecting pins 113 and 113.

Accordingly, the rigid chain part 110G is supported in a range equal to or more than the pin-to-pin distance D between the pair of front and rear connecting pins 113 and 113, so that the interlocking chains 110 are more smoothly driven in a state where chain rigidity is further improved by reliably avoiding disengagement between the pair of interlocking chains 110 and 110 and reliably supporting the rigid chain part 110G.

In the interlocking chain type forward and backward actuating device 100, a drive sprocket housing groove 133 having an opening 133A opened toward the side face of the rigid chain part 110G and housing the drive sprocket 120 is formed on the chain guide 130. The terminal end of the planar chain support face 132AS overlaps with the imaginary boundary plane side opening end OE formed on the side closer to the imaginary boundary plane S of the two opening ends of the opening 133A.

Accordingly, the movement for interlocking between the hook-shaped inner tooth plates 111 and the movement for interlocking between the hook-shaped outer tooth plates 112 are completed before the hook-shaped inner tooth plates 111 and the hook-shaped outer tooth plates 112 are driven to the imaginary boundary plane side opening end OE. Thus, the rigid chain part 110G is reliably prevented from disassembling, that is, disengaging, and the interlocking chains 110 are more smoothly driven.

In the interlocking chain type forward and backward actuating device 100, the pair of hook-shaped inner tooth plates 111 and 111 are spaced from each other in the chain width direction W. The actuating device 100 has a positioning chain guide portion 134 located in the fork region R2 of the pair of interlocking chains 110 and 110. The positioning chain guide portion 134 has a mountain-shaped chain guide portion 134B and a straight chain support portion 134A. The chain guide portion 134B guides the chain disengaged portions 110H along flared facing guide faces 134BS facing the curved guide faces 132BS. The straight chain support portion 134A extends from the imaginary boundary plane S to a hollow region R1 of the rigid chain part 110G and supports the rigid chain part 110G by the planar chain support side faces 134AS facing the planar chain support faces 132AS.

Accordingly, the rigid chain part 110G is supported from the hollow region R1, that is, the inside of the rigid chain part 110G and the outside of the rigid chain part 110G, so that the rigid chain part 110G is reliably supported so as not to disengage and the interlocking chains 110 are more smoothly driven.

In the interlocking chain type forward and backward actuating device 100, the planar chain support side face 134AS extends from the imaginary boundary plane S toward the opening 133A for a distance equal to or longer than the pin-to-pin distance D between the pair of front and rear connecting pins 113 and 113.

Accordingly, the rigid chain part 110G is supported from the imaginary boundary plane S over the length equal to or more than the pin-to-pin distance D between the pair of front and rear connecting pins 113 and 113 from the hollow region R1, that is, the inside of the rigid chain part 110G and the outside of the rigid chain part 110G. Thus, the rigid chain part 110G is reliably supported so as not to disengage and the interlocking chains 110 are more smoothly driven.

The pair of planar chain support faces 132AS and 132AS sandwiching and supporting the rigid chain part 110G from both sides of the rigid chain part 110G constitute portions of the guide groove faces 132 and 132 of the chain guide grooves 131 and 131 while being continuous to the pair of curved guide faces 132BS and 132BS. The curved guide faces 132BS and 132BS respectively guide the chain disengaged portions 110H and 110H of the pair of interlocking chains 110 and 110 disengaged from each other. Accordingly, the space occupied by the engagement portion between the interlocking chain 110 and the drive sprocket 120 is reduced and the space inside the device is effectively utilized. A device configuration optimum for chain driving is selected while avoiding limitation in combination of respective components of the drive sprocket 120 and the interlocking chain 110. In addition, the interlocking chains 110 can be smoothly driven in a state where the chain rigidity is improved by reliably avoiding disengagement between the pair of interlocking chains 110 and 110 and reliably supporting the rigid chain part 110G. The interlocking chain type forward and backward actuating device 100 of the present embodiment thus achieves significant advantages.

Next, modifications of the above-described interlocking chain type forward and backward actuating device 100 will be described with reference to FIGS. 5 to 12.

In the following first to fifth modifications, components common to those of the above-described interlocking chain type forward and backward actuating device 100 are provided with common reference symbols, and detailed description thereof is omitted.

As shown in FIG. 5, an interlocking chain type forward and backward actuating device according to a first modification has two drive sprockets 120 symmetrically arranged on both sides of the pair of interlocking chains 110 and 110. The pair of interlocking chains 110 and 110 are driven by the drive sprockets 120. Therefore, the interlocking chains 110 and 110 are driven with a greater driving force as compared with the case where the pair of interlocking chains 110 and 110 are driven by one drive sprocket 120. Thus, the pair of interlocking chains 110 and 110 are driven at a high speed in addition to the advantages achieved by the above-described interlocking chain type forward and backward actuating device 100.

As shown in FIG. 6, an interlocking chain type forward and backward actuating device according to a second modification has two drive sprockets 120 and 120 arranged at heights different from each other in the driving direction of the rigid chain part 110G, that is, the up-down direction in the drawing. An imaginary boundary face side opening end OE2, which is one of imaginary boundary plane side opening ends OE1 and OE2 positioned on both sides of the pair of interlocking chains 110 and 110, is at a distance equal to or more than the pin-to-pin distance D from the imaginary boundary plane S.

Accordingly, the interlocking chains are driven with a greater driving force as compared with the case where the pair of interlocking chains 110 and 110 are driven by one drive sprocket 120. Thus, the pair of interlocking chains 110 and 110 are driven at a high speed in addition to the advantages achieved by the above-described interlocking chain type forward and backward actuating device 100.

As shown in FIG. 7, in an interlocking chain type forward and backward actuating device according to a third modification, upper ends of the planar chain support side faces 134AS and 134AS formed on both sides of the pair of interlocking chains 110 and 110 are positioned at different heights from each other.

Accordingly, cancellation of the rigid chain part 110G, which is caused by an asynchronous state of the two drive sprockets 120 and 120 arranged at heights different from each other on both sides of the pair of interlocking chains 110 and 110, that is, disengagement between the pair of interlocking chains 110 and 110, is avoided. Thus, the pair of interlocking chains 110 and 110 can be more smoothly driven as compared with the above-described interlocking chain type forward and backward actuating device 100.

As shown in FIGS. 8 and 9, an interlocking chain type forward and backward actuating device according to a fourth modification has rows of interlocking chains 110, which are formed by coupling pairs of hook-shaped inner tooth plates 111 and pairs of hook-shaped outer tooth plates 112 in the chain width direction W, and by engaging the drive sprocket 120 with an engagement row different from supported rows that come into contact with the planar chain support faces 132AS of the plurality of rows. Thus, the chain rigidity is improved as compared with the interlocking chains composed of a single row, so that the interlocking chains 110 are driven by more reliably supporting the rigid chain part 110G so as not to disengage.

As shown in FIGS. 10 to 12, in an interlocking chain type forward and backward actuating device according to a fifth modification, the connecting pins 113 are guided by the chain guide grooves 131 while projecting to the outside from the plate faces of the hook-shaped outer tooth plates 112. Therefore, the rigid chain part 110G is reliably supported so as not to disengage, and the interlocking chains are more smoothly driven.

In the interlocking chain type forward and backward actuating devices according to the above-described fourth and fifth modifications, the opening 133A facing the chain guide groove 131 is not formed. Thus, collision of the opening end of the opening 133A with chain sliding portions such as rollers and bushings is avoided, so that chain vibration and chain collision noise caused by collision are avoided.

The interlocking chains to be applied to the above-described interlocking chain type forward and backward actuating device may be a bushing-chain type composed of plates, bushings, and connecting pins shown in FIG. 3. Also, the interlocking chains may be composed of the connecting pins and plates shown in FIGS. 10 to 12. Alternatively, interlocking chains may be a roller-chain type including rollers loosely fitted with the bushings of bushing chains, or may be the one which guides projecting portions in which the connecting pins shown in FIG. 3 are projected from the plates.

Specifically, any interlocking chains can be used without changes to the advantages of the present invention as long as the chains have hook-shaped engagement portions and are integrated to be rigid.

Description of the Reference Numerals

100 . . . interlocking chain type forward and backward actuating device
110 . . . interlocking chain
110G . . . rigid chain part
111 . . . hook-shaped inner tooth plate
112 . . . hook-shaped outer tooth plate
113 . . . connecting pin
114 . . . bushing
120 . . . drive sprocket
121 . . . drive shaft
130 . . . chain guide
131 . . . chain guide groove
132 . . . guide groove face
132AS . . . planar chain support face
132BS . . . curved guide face
133 . . . drive sprocket housing groove
133A . . . opening of drive sprocket housing groove
134 . . . positioning chain guide portion
134A . . . straight chain support portion
134B . . . mountain-shaped chain guide portion
134AS . . . planar chain support side face
134BS . . . flared facing guide face
140 . . . base plate
150 . . . drive motor
151 . . . power transmission chain
152 . . . driven side sprocket
800 . . . interlocking chain type lifting device
810 . . . interlocking chain
D . . . pin-to-pin distance between pair of front and rear connecting pins
D1 . . . pin-to-pin distance on an imaginary boundary plane
D2 . . . pin-to-pin distance in a rigid state
G . . . installation face
OE, OE1, OE2 . . . imaginary boundary plane side opening end
R1 . . . hollow region of rigid chain part
R2 . . . fork region of pair of interlocking chains
S . . . imaginary boundary plane
T . . . driven body

The invention claimed is:

1. An interlocking chain type forward and backward actuating device comprising a pair of interlocking chains, a drive sprocket, and a chain guide, wherein the interlocking chains are each composed by coupling, in the chain longitudinal direction, a plurality of pairs of hook-shaped inner tooth plates facing each other in the chain width direction and a plurality of pairs of hook-shaped outer tooth plates arranged on the outer sides of the hook-shaped inner tooth plates in the chain width direction by pairs of front and rear connecting pins, the interlocking chains are integrally made rigid to form a rigid chain part in a state where the interlocking chains are interlocked with each other and arranged to face each other, the interlocking chains are disengaged from each other to bifurcate, the drive sprocket engages with a first one of the pair of interlocking chains from the side face of the rigid chain part to freely advance and retreat the pair of interlocking chains, and the chain guide has chain guide grooves that interlock a second one of the interlocking chains with the first interlocking chain to drive the second interlocking chain so as to follow the first interlocking chain, wherein a pair of planar chain support faces sandwiching and supporting the rigid chain part from both sides of the rigid chain part is provided, the planar chain support faces constitute parts of the guide groove faces of the chain guide grooves in a state where the planar chain support faces are continuous to a pair of curved guide faces, which respectively guide chain disengaged portions of the interlocking chains disengaged from each other, the planer chain support faces are arranged to face an interlocked portion between the interlocking chains forming the rigid chain part, the connecting pins of the first interlocking chain include a first connecting pin, which is located on an imaginary boundary plane dividing the planar chain support face and the curved guide face, the connecting pins of the second interlocking chain include a second connecting pin, which faces the first connecting pin along the imaginary boundary plane, the distance between the first connecting pin and the second connecting pin is defined as a pin-to-pin distance on the imaginary boundary plane, the connecting pins of the rigid chain part include a pair of connecting pins that face each other in parallel to the imaginary boundary plane dividing the planar chain support face and the curved guide face, the distance between the pair of connecting pins is defined as a pin-to-pin distance in a rigid state, and the pin-to-pin distance on the imaginary boundary plane is equal to the pin-to-pin distance in a rigid state.

2. The interlocking chain type forward and backward actuating device according to claim 1, wherein the planar chain support face extends from the imaginary boundary plane for a distance equal to or longer than a pin-to-pin distance between the pair of front and rear connecting pins.

3. The interlocking chain type forward and backward actuating device according to claim 1, wherein a drive sprocket housing groove is formed in the chain guide, the drive sprocket housing groove has an opening opened toward the side face of the rigid chain part and houses the drive sprocket, the opening has two opening ends, one of which is defined as an imaginary boundary plane side opening end formed on the side closer to the imaginary boundary plane, and the terminal end of the planar chain support face overlaps with the imaginary boundary plane side opening end.

4. The interlocking chain type forward and backward actuating device according to claim 1, wherein the pair of hook-shaped inner tooth plates are spaced from each other in the chain width direction, a positioning chain guide portion is provided in a fork region of the pair of interlocking chains, and the positioning chain guide portion includes a mountain-shaped chain guide portion that guides the chain disengaged portions along flared facing guide faces facing the curved guide faces, and a straight chain support portion that extends from the imaginary boundary plane to a hollow region of the rigid chain part, wherein the straight chain support portion supports the rigid chain part by planar chain support side faces, which face the planar chain support faces.

5. The interlocking chain type forward and backward actuating device according to claim 4, wherein the planar chain support side face extends from the imaginary boundary plane toward the opening for a distance equal to or longer than the pin-to-pin distance between the pair of front and rear connecting pins.

6. The interlocking chain type forward and backward actuating device according to claim 1 wherein the interlocking chains are composed of a plurality of rows by coupling pairs of the hook-shaped inner tooth plates and pairs of the hook-shaped outer tooth plates in the chain width direction, the rows include a supported row that comes into contact with the planar chain support face and an engagement row different from the supported row, and the drive sprocket engages with the engagement row.

7. The interlocking chain type forward and backward actuating device according to claim 1, wherein the connecting pins are guided by the chain guide grooves while projecting to the outside from plate faces of the hook-shaped outer tooth plates.

* * * * *